US006754348B1

(12) United States Patent
Sako

(10) Patent No.: US 6,754,348 B1
(45) Date of Patent: Jun. 22, 2004

(54) SYSTEM AND METHOD FOR DETERMINING WINNER

(75) Inventor: Kazue Sako, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/577,662

(22) Filed: May 25, 2000

(30) Foreign Application Priority Data

May 26, 1999 (JP) .......................................... 11-145772

(51) Int. Cl.[7] .......................... H04L 9/00; G06F 17/60; A63F 13/00; A63F 9/24

(52) U.S. Cl. ......................... 380/251; 380/277; 380/59; 463/17; 463/25; 705/12

(58) Field of Search ................................ 380/251, 277, 380/59; 463/17, 25; 705/12

(56) References Cited

U.S. PATENT DOCUMENTS 5,954,582 A * 9/1999 Zach .......................... 463/25
6,030,288 A * 2/2000 Davis et al. ................. 463/29
6,377,688 B1 4/2002 Numao
6,595,855 B2 7/2003 Sako

FOREIGN PATENT DOCUMENTS

JP 5-22437 1/1993
JP 9-44717 2/1997
JP 10-207971 8/1998
JP 10-301491 11/1998

* cited by examiner

*Primary Examiner*—Gilberto Barrón
*Assistant Examiner*—Benjamin E. Lanier
(74) *Attorney, Agent, or Firm*—Foley & Lardner LLP

(57) ABSTRACT

A system and method for determining winner is capable of keep all of the voting contents secret with permitting only determination of winning or losing, and further permitting the third party to verify the determination. The system generally includes voter sub-systems for voting a voting value indicative of a selected event among a finite number of events, and a management sub-system for identifying at least one voter sub-system voted a winning value determined among the finite number of events as a winner. The voter sub-system includes encrypting parameter obtaining means for obtaining an encrypting parameter depending upon the voting value, encryption processing means for generating a cryptographic voting data by performing encrypting process on the basis of the encrypting parameter obtained by the encrypting parameter obtaining means, and transmitting means for transmitting the cryptographic voting data generated by the cryptography processing means. The management sub-system includes receiving means for receiving the cryptographic voting data until a predetermined reception time limit, decoding parameter obtaining means for obtaining decoding parameter for the winning value and retrieving means for retrieving the voting value matching with the winning value with decoding the cryptographic voting data received by the receiving means with the decoding parameter obtained by the decoding parameter obtaining means.

11 Claims, 13 Drawing Sheets

SYSTEM AND METHOD FOR DETERMINING WINNER

BACKGROUND OF THE INVENTION

1. Field of the Invention

The present invention relates generally to a winner determining system. More particularly, the invention relates to a winner determining method of advance voting a winning horse in a horse racing, a winner in sporting, a hit point in a roulette, an answer of a quiz and so forth, and determining winner by a voted value.

2. Description of the Related Art

Conventionally, a method of preliminarily voting of this type, advance voting is performed by issuing a kind of card or the like indicating the voted value to a voter, making the voter to write a voting value on a preliminarily issued card or the like, putting an article, such as coin, chip or the like, on a board printed candidate values at a position corresponding to a voting value which the voter desires to vote. Namely, the value preliminarily voted by the voter is opened to the public.

The foregoing winner determining method takes an analog method. Even if digital method, namely electronic method is simply applied in place of the analog method, what is voted by the voter will not be kept secret upon arrival of the voted value.

It should be noted that while it is not directly related to the foregoing winner determining method, Japanese Unexamined Patent Publication No. Heisei 5-22437 discloses a method for taking a part of prize competition and Japanese Unexamined Patent Publication No. Heisei 9-44717 discloses an electrical home appliance with a function of lot.

In the foregoing conventional winner determining method, all of the voting contents are open to easily determine the winner. However, information what are voted by those other than the winner (namely, non-winners) may be known. At this time, when all voting contents are made secret, it becomes difficult to determine who voted winning number or correct answer.

SUMMARY OF THE INVENTION

The present invention has been worked out in view of the problems set forth above. It is an object of the present invention to provide a system and a method of determining a winner which can keep all voting contents secret, determine only winner, and permit verification of determination of the winner by a third party.

According to the first aspect of the present invention, a winner determining system comprises:

voter sub-systems for voting a voting value indicative of a selected event among a finite number of events;

a management sub-system for identifying at least one voter sub-system voted a winning value determined among the finite number of events as a winner;

the voter sub-system including encrypting parameter obtaining means for obtaining an encrypting parameter depending upon the voting value, encryption processing means for generating a cryptographic voting data by performing encrypting process on the basis of the encrypting parameter obtained by the encrypting parameter obtaining means, and transmitting means for transmitting the cryptographic voting data generated by the cryptography processing means; and the management sub-system including receiving means for receiving the cryptographic voting data until a predetermined reception time limit, decoding parameter obtaining means for obtaining decoding parameter for the winning value and retrieving means for retrieving the voting value matching with the winning value with decoding the cryptographic voting data received by the receiving means with the decoding parameter obtained by the decoding parameter obtaining means.

In the preferred construction, the encryption processing means encrypts a known value using the encrypting parameter corresponding to the voting value obtained by the encrypting parameter obtaining means; and the retrieving means includes decoding processing means for sequentially performing decoding process for the cryptographic voting data received by the receiving means with the decoding parameter obtained by the decoding parameter obtaining means, and determining means for determining that the voting value matches with the winning value when the result of process of the decoding processing means becomes the known value.

In further preferred construction, the encryption processing means includes a process for encrypting the known value with a public key corresponding to the voting value, and the decoding processing means includes a process for decoding the cryptographic voting data with a secure key corresponding to the public key corresponding to the winning value.

The management sub-system may further include pronouncement means for pronouncing a part of the decoding parameter corresponding to the voting value and a result of decoding. Also, the management sub-system may further include second pronouncement means for pronouncing a guarantee information guarantying validity of the winning value in advance.

As can be appreciated herefrom, the winner determining system according to the present invention realizes a function to supply the encrypting parameter depending upon the voting value to a portion performing encrypting function in the voter sub-system, and a function of decoding with the decoding parameter depending upon the winning value for determining the winner in the management sub-system. By introducing the encrypting parameter and the decoding parameter, it becomes possible to only determine the voting value matching with the winning value.

Accordingly, the voter who voted the value matching with the winning value can be a winner. Furthermore, what is voted by the voters other than the winner can be kept secret.

According to the second aspect of the present invention, a winner determining method comprises:

providing voter sub-systems for voting a voting value indicative of a selected event among a finite number of events;

providing a management sub-system for identifying at least one voter sub-system voted a winning value determined among the finite number of events as a winner;

the voter sub-system including the steps of obtaining an encrypting parameter depending upon the voting value, generating a cryptographic voting data by performing encrypting process on the basis of the encrypting parameter obtained by the encrypting parameter obtaining means, and transmitting the cryptographic voting data generated by the cryptography processing means; and the management sub-system including the steps of receiving the cryptographic voting data until a predetermined reception time limit, obtaining decoding parameter for the winning value and retrieving the voting value matching with the winning value with decoding the cryptographic voting data received by the receiving means with the decoding parameter obtained by the decoding parameter obtaining means.

In the preferred process, cryptograph voting data generating step comprises a step of encrypting a known value using the encrypting parameter corresponding to the voting value obtained by the encrypting parameter obtaining means;

the retrieving step comprises the steps of sequentially performing decoding process for the cryptographic voting data received by the receiving means with the decoding parameter obtained by the decoding parameter obtaining means, and determining that the voting value matches with the winning value when the result of process of the decoding processing means becomes the known value.

In also preferred process, the step of generating cryptograph voting data comprises a step of encrypting the known value with a public key corresponding to the voting value, and the step of sequentially decoding cryptographic voting data comprises the step of decoding the cryptographic voting data with a secure key corresponding to the public key corresponding to the winning value.

The management sub-system may further comprise a step of pronouncing a part of the decoding parameter corresponding to the voting value and a result of decoding. The management sub-system may further comprise a step of pronouncing a guarantee information guarantying validity of the winning value in advance.

According to the third aspect of the present invention, in a winner determining system comprising voter sub-systems for voting a voting value indicative of a selected event among a finite number of events and a management sub-system for identifying at least one voter sub-system voted a winning value determined among the finite number of events as a winner, a recording medium storing a winner determination control program to be executed in the winner determining system comprises:

a process operating the voter sub-system for obtaining an encrypting parameter depending upon the voting value, generating a cryptographic voting data by performing encrypting process on the basis of the encrypting parameter obtained by the encrypting parameter obtaining means, and transmitting the cryptographic voting data generated by the cryptography processing means; and a process operating the management sub-system for receiving the cryptographic voting data until a predetermined reception time limit, obtaining decoding parameter for the winning value and retrieving the voting value matching with the winning value with decoding the cryptographic voting data received by the receiving means with the decoding parameter obtained by the decoding parameter obtaining means.

BRIEF DESCRIPTION OF THE DRAWINGS

The present invention will be understood more fully from the detailed description given hereinafter with reference to the accompanying drawings of the preferred embodiment of the present invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
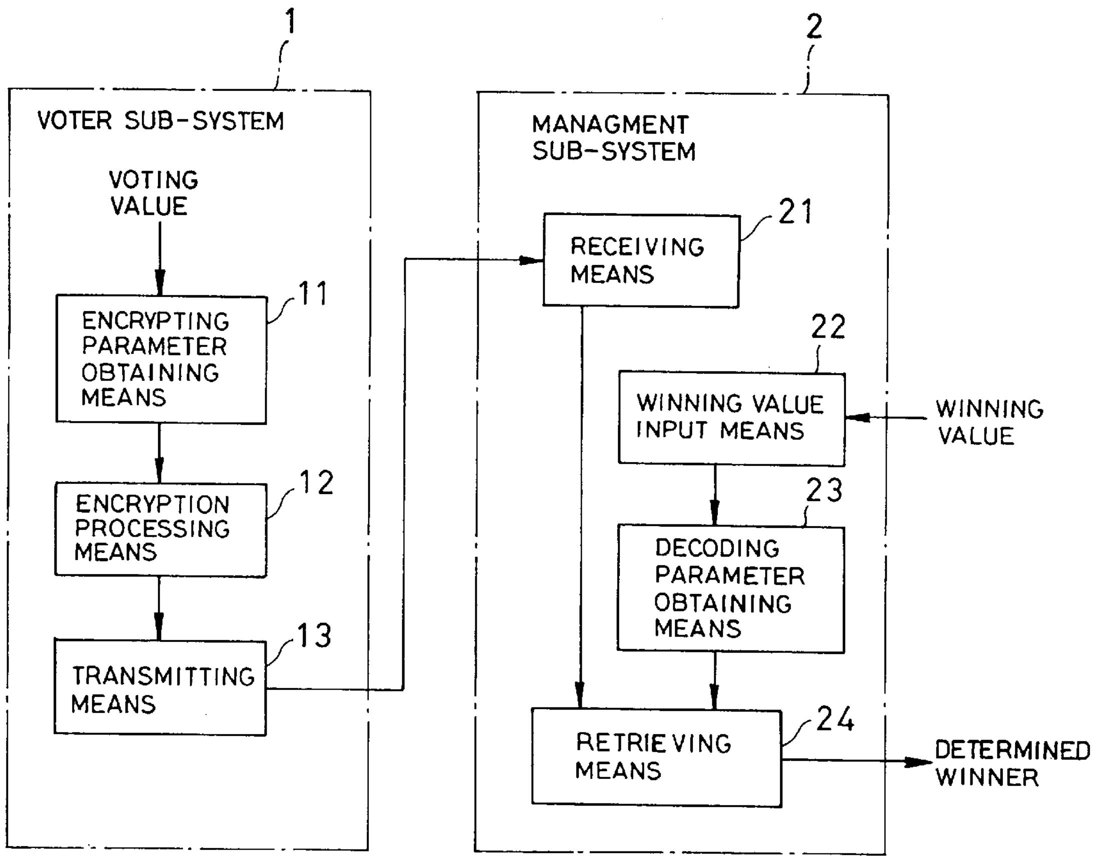
FIG. 1 is a block diagram showing a construction of the first embodiment of a winner determining system according to the present invention.

FIG. 1 is a block diagram showing a construction of the first embodiment of a winner determining system according to the present invention. In FIG. 1, the first embodiment of the winner determining system of the present invention is constructed with a voter sub-system 1 and a management sub-system 2.

The voter sub-system 1 includes cryptographic parameter obtaining means 11, encryption processing means 12 and transmitting means 13. The management sub-system 2 includes receiving means 21, winning value inputting means 22, decoding parameter obtaining means 23 and retrieving means 24.

An input to the voter sub-system 1 becomes a voting value set by the voter sub-system 1. The voting value is supplied to the cryptographic parameter obtaining means 11. The cryptographic parameter obtaining means 11 obtains a cryptographic parameter necessary for the encryption processing means 12 depending upon the voting value.

The encryption processing means 12 performs encrypting operation on the basis of supplied cryptographic parameter to supply cryptographic voting data to the transmitting means 13. The transmitting means 13 supplies the cryptographic voting data to the management sub-system 2.

The receiving means 21 of the management sub-system 12 receives the cryptographic voting data transmitted from each voter sub-system 1 to supply the cryptographic voting data to the retrieving means 24 after a given reception period. In the winning value inputting means 22, the winning value input to the management sub-system 2 is supplied to the decoding parameter obtaining means 23.

The decoding parameter obtaining means 23 obtains the decoding parameter depending upon the winning value to supply to the retrieving means 24. The retrieving means 24 decodes the cryptographic voting data using the decoding parameter and performs retrieval whether the voting value matching with the winning value is present or not. The retrieving means 24 determines all of the voter sub-systems transmitted the cryptographic voting data corresponding to the voting value matching with the winning value, as winner, if the voting value matching with the winning value is present. If the cryptographic voting data generated as the voting value matching with the winning value, the retrieving means 24 makes judgment that no-winner is present. Then, process is terminated.

Figure 2:
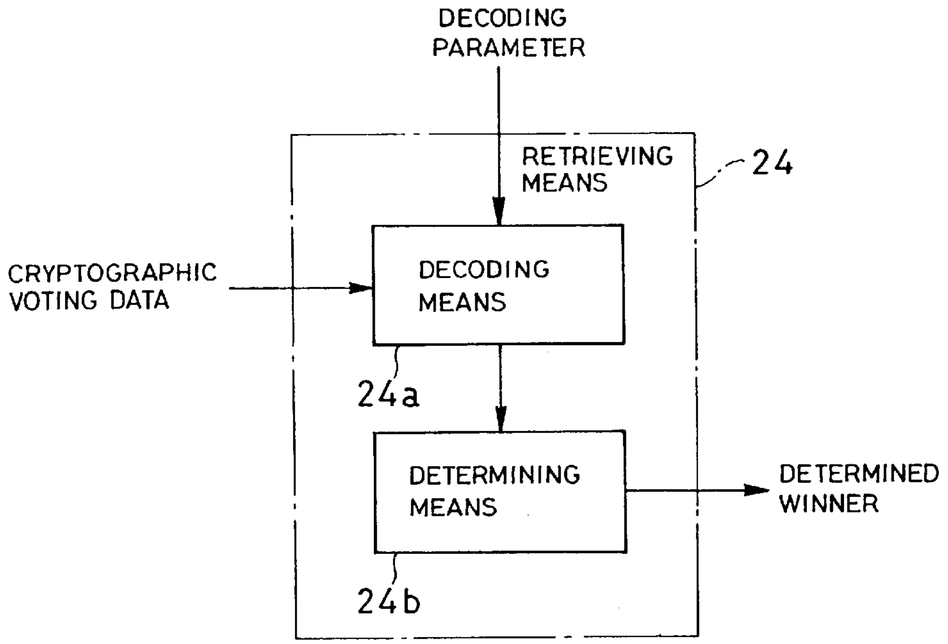
FIG. 2 is a block diagram showing a construction of a retrieving means of FIG. 1.

FIG. 2 is a block diagram showing a construction of the retrieving means 24 of FIG. 1. In FIG. 2, the retrieving means is constructed with decoding means 24*a* for the cryptographic voting data using the decoding parameter and determining means 24*b* determining whether the voting value matching with the winning value is present or not on the basis of the result of decoding.

Figure 3:
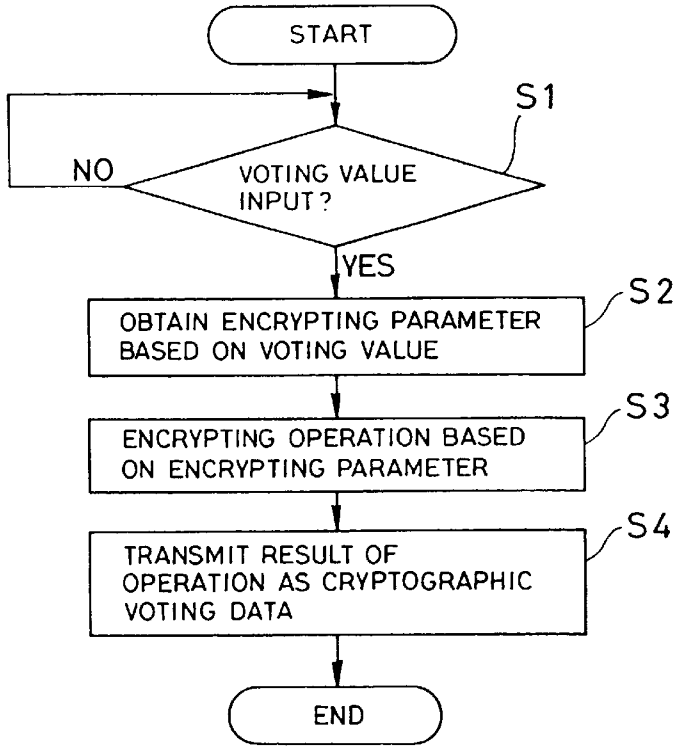
FIG. 3 is a flowchart showing a process operation of a voter sub-system of FIG. 1.
Figure 4:
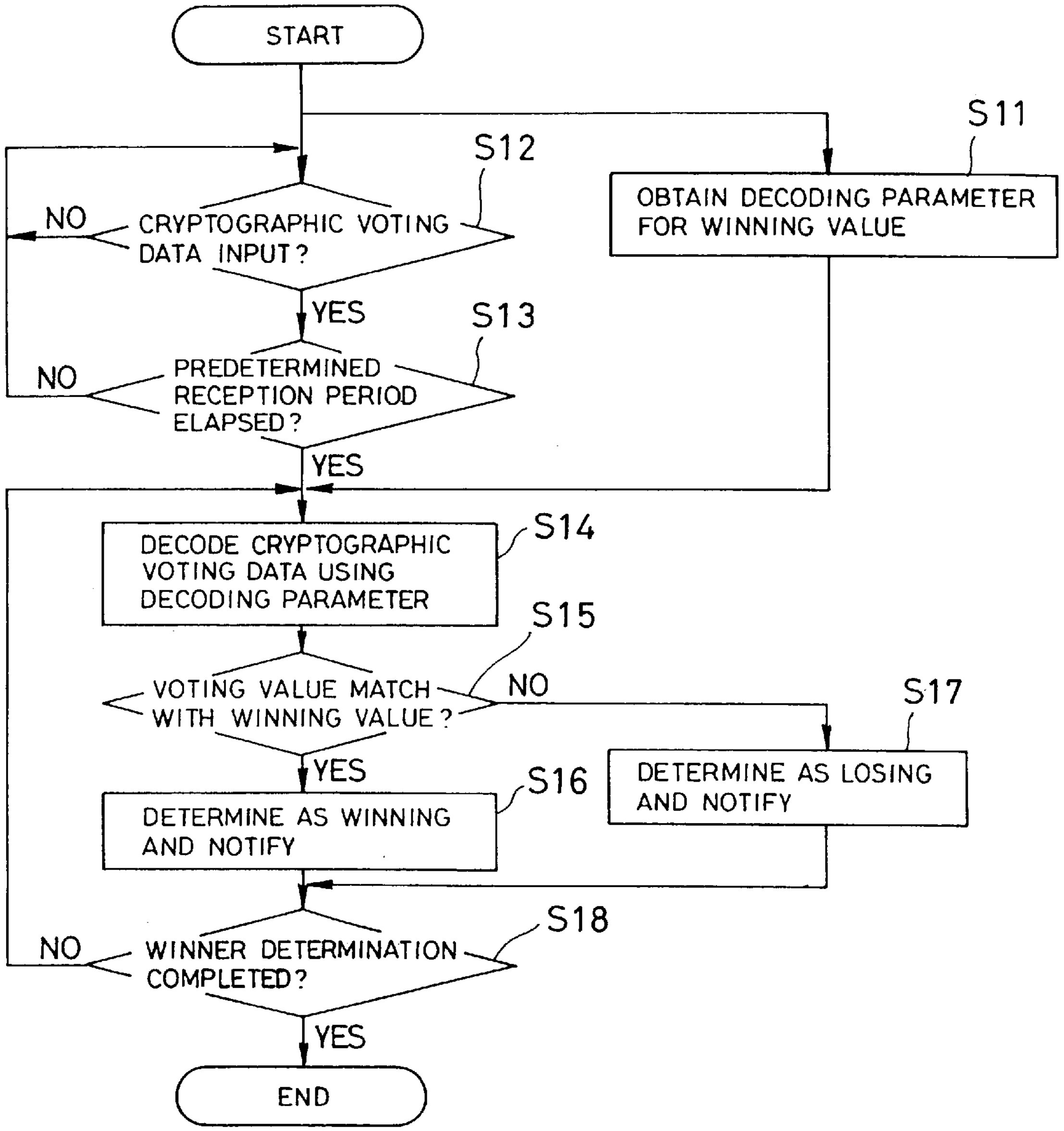
FIG. 4 is a flowchart showing a process operation of a management sub-system of FIG. 1.

FIG. 3 is a flowchart showing a process operation of the voter sub-system 1 of FIG. 1, and FIG. 4 is a flowchart showing a process operation of the management sub-system 2 of FIG. 1. Operation of the first embodiment of the winner determining system of the present invention will be discussed with reference to FIGS. 1 to 4. The process shown in FIGS. 3 and 4 can be realized by executing programs stored in not shown control memories in the voter sub-system 1 and the management sub-system 2. As the control memory, ROM (read-only-memory), IC (integrated circuit) memory and so forth may be used.

The cryptographic parameter obtaining means 11 of the voter sub-system 1 is responsive to inputting of the voting value (step S1 of FIG. 3) to obtain the cryptographic parameter necessary for the encryption processing means 12 depending upon the voting value, and supply the cryptographic parameter to the encryption processing means 12 (step S2 of FIG. 3).

The encryption processing means 12 performs encrypting operation on the basis of the supplied cryptographic parameter to supply the result of operation to the transmitting means (step S3 of FIG. 3). The transmitting means 13 supplied the result of operation to management sub-system 2 as the cryptograph voting data (step S4 of FIG. 3).

In the winning value input means 22 of the management sub-system 2, the winning value input to the management sub-system 2 is supplied to the decoding parameter obtaining means 23. The decoding parameter obtaining means 23 is responsive to the input winning value to obtain the decoding parameter depending upon the winning value to supply the retrieving means 24 (step S11 of FIG. 4).

On the other hand, the receiving means 21 is responsive to the cryptographic voting data transmitted from each voter sub-system 1 (step S12 of FIG. 4), and supplies the cryptographic voting data to the retrieving means 24 after reception of the predetermined reception period (step S13 of FIG. 4). The retrieving means 24 decodes the cryptographic voting data using the decoding parameter (step S14 of FIG. 4) to perform retrieval of the voting value matching with the winning value (step S15 of FIG. 4).

When the voting value matching with the winning value is present, the retrieving means 24 determines all of the voter sub-systems 1 which transmit the cryptographic voting data of the voting value matching with the winning value as winners (step S16 of FIG. 4). If the cryptographic voting data of the voting value matching with the winning value is not present, the retrieving means 24 makes judgment that the winner is not present (steps S17 and 18 of FIG. 4). Then, process is terminated.

Here, discussion will be given for encrypting process to be employed in the first embodiment of the winning determining system according to the present invention. As a particular example, discussion will be given for an example, in which ElGamal cryptograph is used as encryption coefficient.

At first, the management sub-system 2 generates a large prime factor p and a generatrix g. On the other hand, for each voting value, a secure key x(v), a public key y(v) and a constant M(v) are determined.

Here, the following relationship is established between the public key y(v) and the secret key x(v). A remainder p of (x(v))th power of the generatrix g is y(v). M(v) can be an arbitrary value. For example, M(v) may be a value derived by combining v and a hash value thereof. In the alternative, M(v) can be a constant not depending upon v.

The cryptographic parameters are M(v), y(v) and encoding parameter is x(v). The cryptographic parameters are opened to the public and the encoding is strictly managed in the managing system.

The voter sub-system 1 obtains the cryptographic parameters M(v), y(v) for with respect to the own desired voting value v and encrypts the cryptographic parameter M(v) with the public key y(v) according to ElGamal encryption. The ElGamal encryption is a kind of so-called a probability encryption and has been known to generate different cryptogram even when the same cryptographic parameter M(v) is encrypted. The voter sub-system 1 transmits the result of encryption as cryptographic voting data C(v) to the management sub-system 2.

The management sub-system 2 obtains a decoding parameter x (v') with respect to the winning value v' and performs decoding of C(v) with taking the decoding parameter as the secure key. At this time, if v=v', it is clear that M(v')=M(v) is established.

On the other hand, when v is not equal to v', the result of decoding will hardly become M(v'). Thus, it becomes possible to determine whether the voting value matches with the winning value without deriving the voting value. It should be noted that ElGamal encryption is well known in the art and is not directly related to the present invention, detailed description thereof will be omitted.

Next, another example of the encrypting process to be employed in the first embodiment of the winner determining system according to the present invention will be discussed. As particular example, an example employing an RSA (Rivest Shamir Adleman) encryption will be discussed.

In this example, the encrypting parameter can be automatically generated from the voting value without requiring looking up a table. On the other hand, the encrypted predetermined value M(v) is not necessarily the predetermined value for all of the voters.

At first, the management sub-system 2 generates large prime factors p and q. A product of multiplication of p and q is taken as n. The voter sub-system 1 generates the encrypting parameter M(v), y(v) with respect to the selected own voting value v in the following manner. In this case, a random number is generated. The encrypting parameter M(v) is derived by combining v and the generated random number and the hash value of the combined value of v and the random number.

Next, as y(v), a hash value of v is taken. The encrypting parameter M(v) is encrypted according to a modulo n RSA encryption with the public key y(v). Since different random number is generated in each voter, different cryptograms are generated by encryption of the same encrypting parameter M(v). The voter sub-system 1 transmits the result of encryption as the cryptographic voting data C(v).

The management sub-system 2 calculates y(v'), namely the hash value for the winning value v' and calculates x(v') as inverse element of y(v') in modulo (p−1) (q−1), as the decoding parameter.

With taking the decoding parameter as the secure key, C8v) is decoded in modulo n. At this time, if v=v', the result of decoding is a correct format consisted of v' of M(v') and a certain random number.

On the other hand, if v and v' are mutually different values, the result of decoding will hardly become the correct format. Thus, it becomes possible to determine whether the voting value matches with the winning value without deriving the voting value per se. It should be noted that since RSA encryption has been known to those skilled in the art and is not directly related to the present invention, detailed description will be omitted.

Figure 5:
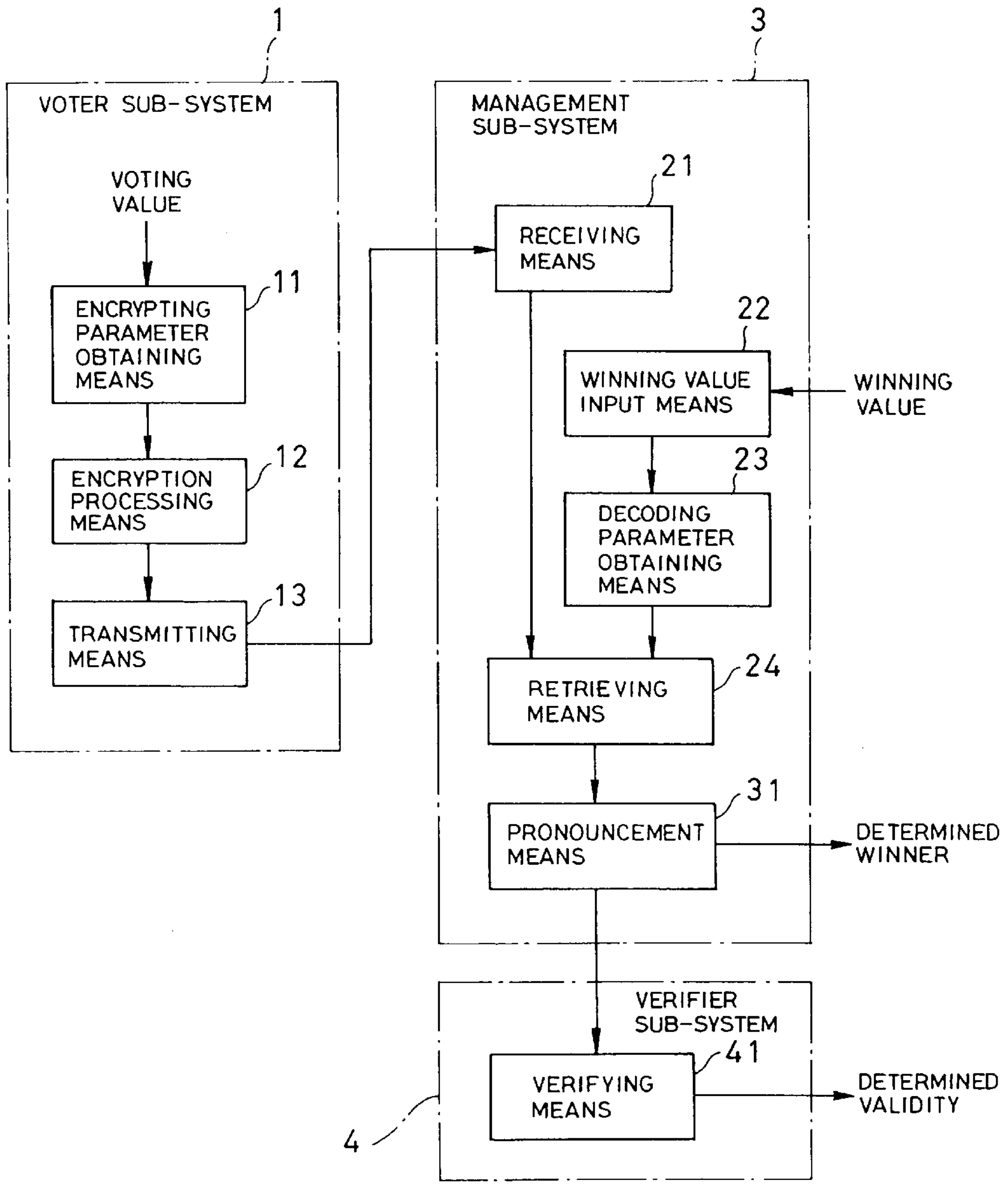
FIG. 5 is a block diagram showing a construction of the second embodiment of a winner determining system according to the present invention.

FIG. 5 is a block diagram showing a construction of the second embodiment of the winner determining system according to the present invention. In FIG. 5, the second embodiment of the winner determining system of the invention is provided with pronouncement means 31 in a management sub-system 3. The pronouncement means 31 is connected to a verifier sub-system 4. Other construction is the same as the first embodiment of the winner determining system shown in FIGS. 1 and 2. The like components to those shown in FIGS. 1 and 2 will be identified by like reference numerals and constructions and operations of those common components will be omitted from the following disclosure in order to avoid redundant disclosure for keeping the disclosure simple enough to facilitate clear understanding of the present invention.

In the second embodiment of the winner determining system of the present invention, validity of the result of determination can be verified by the verifier sub-system 4. The verifier sub-system 4 is provided with verification means 41.

In the second embodiment of the winner determining system of the present invention, after determining the winner, all of the cryptographic voting data received by the pronouncement means 31 of the management sub-system 3, a part of the decoding parameter corresponding to the winning value v and the result of decoding using the decoding parameter are made open.

The verifier sub-system 4 can verify that the voting value of the winner is equal to the winning value v and that no other voter voted the value matching with the winning value. However, the verifier sub-system 4 may not know what are voted on the voter sub-systems 1 other than the winner.

It can be guaranteed that no cryptographic voting data out of a voting period has been received among the cryptographic voting data input to the management sub-system 3, by opening the cryptographic voting data received before a predetermined voting time limit and limiting candidates of winning to those opened. However, this point is not directly related to the present invention, and thus detailed description thereof will be omitted.

Furthermore, it can be guaranteed not to decode invalid cryptographic voting data in the management sub-system by utilizing a secure discretion, group discretion technology and so forth and by generating and/or managing the decoding parameters in a plurality of sub-systems. However, this point is not directly related to the present invention, and thus detailed description thereof will be omitted.

Figure 6:
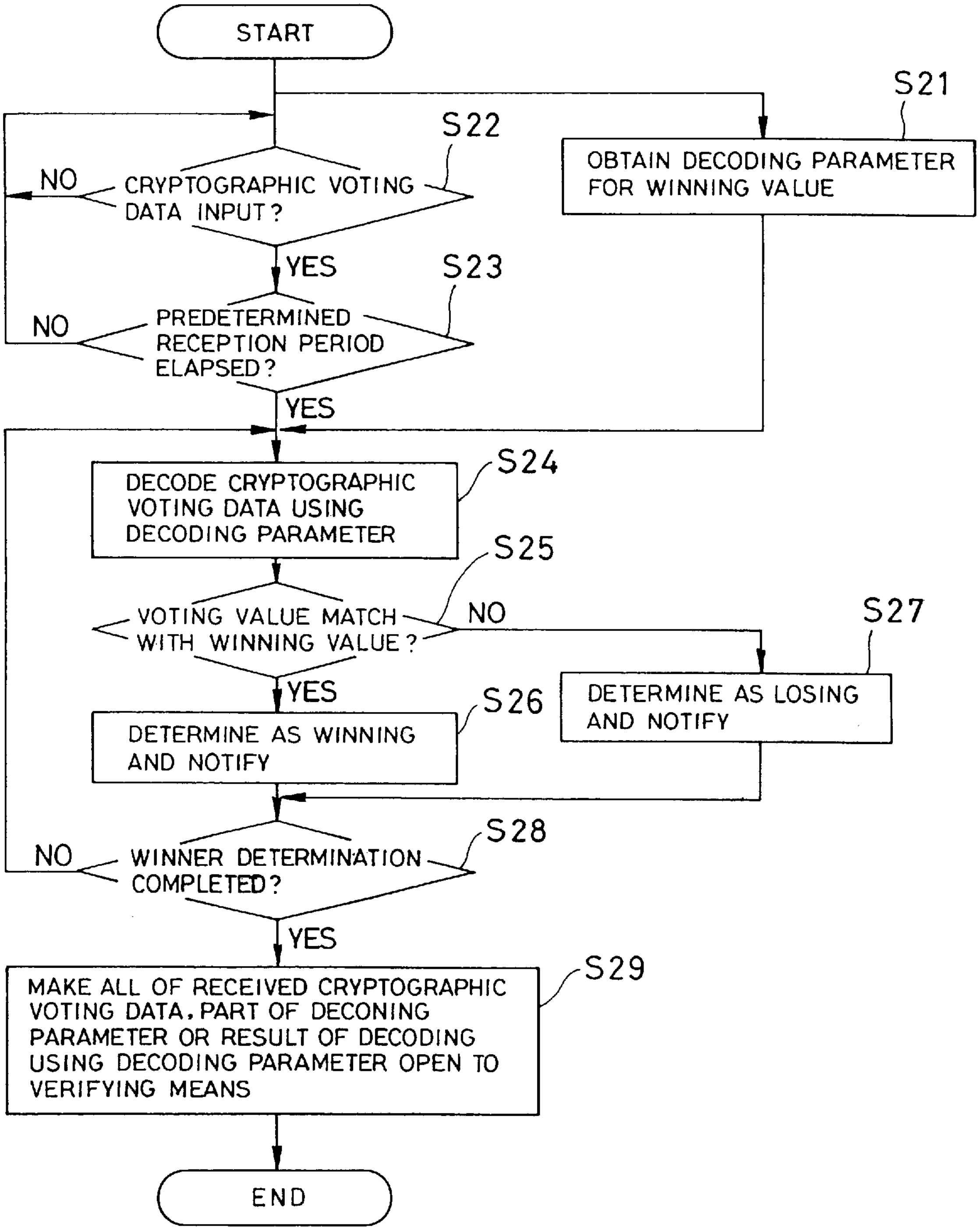
FIG. 6 is a flowchart showing a process operation of a management sub-system of FIG. 5.

FIG. 6 is a flowchart showing a process operation of the management sub-system 3. The operation of the second embodiment of the winner determining system according to the present invention will be discussed with reference to FIGS. 5 and 6. It should be noted that the process operation of the voter sub-system is same as the first embodiment of the invention, the discussion will be omitted in order to avoid redundant disclosure and whereby to keep the disclosure simple enough to facilitate clear understanding of the present invention. The process shown in FIG. 6 is realized by executing the program stored in the not shown control memory in the management sub-system. As the control memory, ROM, IC memory and the like may be used.

In the winning value input means 22 of the management sub-system 3, the winning value input to the management sub-system 3 is supplied to the decoding parameter obtaining means 23. The decoding parameter obtaining means 23 is responsive to the winning value input thereto to obtain the decoding parameter depending upon the winning value for supplying to the retrieving means 24 (step 21 of FIG. 6).

On the other hand, upon reception of the cryptographic voting data transmitted from each voter sub-system 1 (step S22 of FIG. 6), the receiving means 21 supplies the received cryptographic voting data to the retrieving means 24 (step 23 of FIG. 6). The retrieving means 24 decodes the cryptographic voting data using the decoding parameter (step S24 of FIG. 6) to perform retrieval whether the voting value matches with the winning value (step S25 of FIG. 6).

If the voting value matching with the winning value is present, the retrieving means 24 determines that all of the voter sub-systems transmitted the cryptographic voting data matching with the winning data are winners (step S26 of FIG. 6) If no cryptographic voting data of the voting value matching with the winning value is present, the retrieving means 24 determines that no winner is present (steps S27 and 28 of FIG. 6.

Subsequently, the pronouncement means 31 makes all of the received cryptographic voting data, a part of the decoding parameter or the result of decoding using the decoding parameter open to the verifying means 41 of the verifier sub-system 4 (step S29 of FIG. 6). Then, the management sub-system 3 terminates the process. The verifier sub-system 4 verifies that the voting value of the winner matches with the winning value and that no body other than the winner has voted the winning value. It should be noted that the contents to be made open to the verifier means 41 is the decoding parameter x(v') in case of the ElGamal encryption and the result of decoding C(v) using the decoding parameter in case of the RSA encryption.

Figure 7:
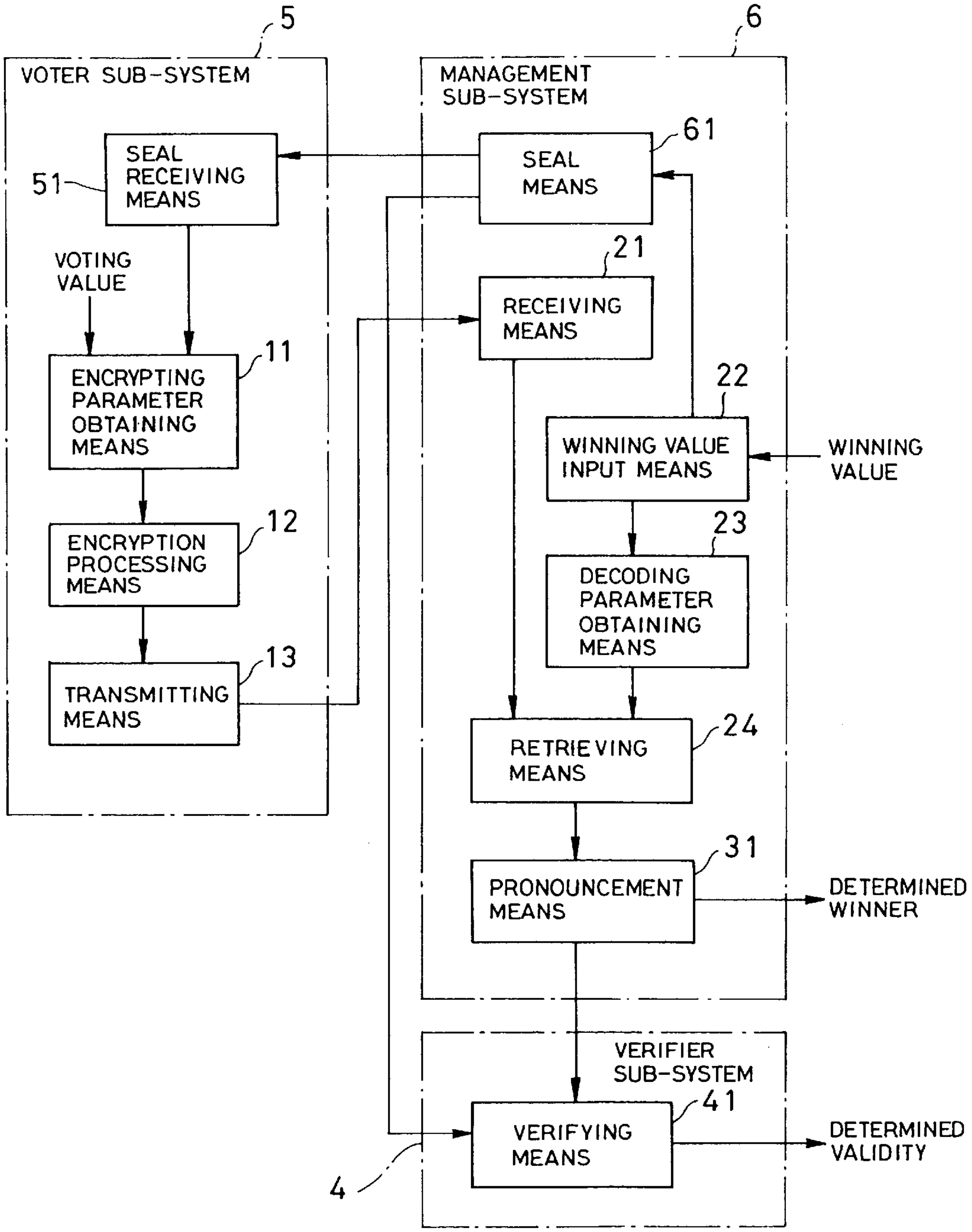
FIG. 7 is a block diagram showing a construction of the third embodiment of a winner determining system according to the present invention.

FIG. 7 is a block diagram of the third embodiment of the winner determining system according to the present invention. In FIG. 7, the third embodiment of the winner determining system has similar construction as the second embodiment of the winner determining system of the invention shown in FIG. 5 except for seal receiving means 51 provided in a voter sub-system 5 and seal means 61 in a management sub-system 6. The like components to those in the second embodiment will be identified by like reference numerals and constructions and operations of those common components will be omitted from the following disclosure in order to avoid redundant disclosure for keeping the disclosure simple enough to facilitate clear understanding of the present invention.

The third embodiment of the winner determining system according to the invention is applicable for voting where the correct answer or the winning value is determined in advance of voting, such as "how many balloons are in the box", for example, other than voting where the correct answer or the winning value is determined by observation of happen after a voting period, such as winning horse number, winner number of sporting, hit number in the roulette and so forth.

In this case, in order to prevent the correct answer (winning value) from being changed, it is desirable to fix the wining value before the voting period. In order to fix the winning value before the voting period, a commitment information of the voting value [definition of "commitment information" has been disclosed in Okamoto and Yamamoto "Modern Cryptograph" (Sangyo Tosho K. K., 1997), pp 143 to 144 as bit commitment] may be made open before voting.

As the commitment information, the winning value v' and the random number r' randomly generated are used and a hash value combining all of the winning value v', the random number r' and a hash value (v'||r') of combined v' and r', namely (v'||r'||h(v'||r')) may be employed.

Validity of the commitment information may be verified by any body through making the random number r' open upon pronouncement of the winning value v' and checking whether the foregoing relational expression is satisfied. In this case, in the seal means 61, the commitment information of the winning value input from the winning value input means 22 is generated. The voter sub-system 5 is made open before voting.

After determining the winner using the third embodiment of the winner determining system according to the present invention, the management sub-system 6 pronounces the winning value v' and the random number r' used in generation of the commitment information by the pronouncement means 31. It should be noted that the voter sub-system 5 is designed not to permit the cryptographic parameter obtaining means 11 to receive the voting value until the commitment information from the seal means 61.

The verifier sub-system 4 verifies that the commitment information pronounced in advance is generated with the winning value made open after determination of the winner and the random number by the verifying means 41. It is also possible that the voter sub-system 5 may also serve as the verifier sub-system. On the other hand, what is sealed by the seal means 61 is not the winner per se, but can be any data serving s guarantee information guarantee validity of the winning value.

Figure 8:
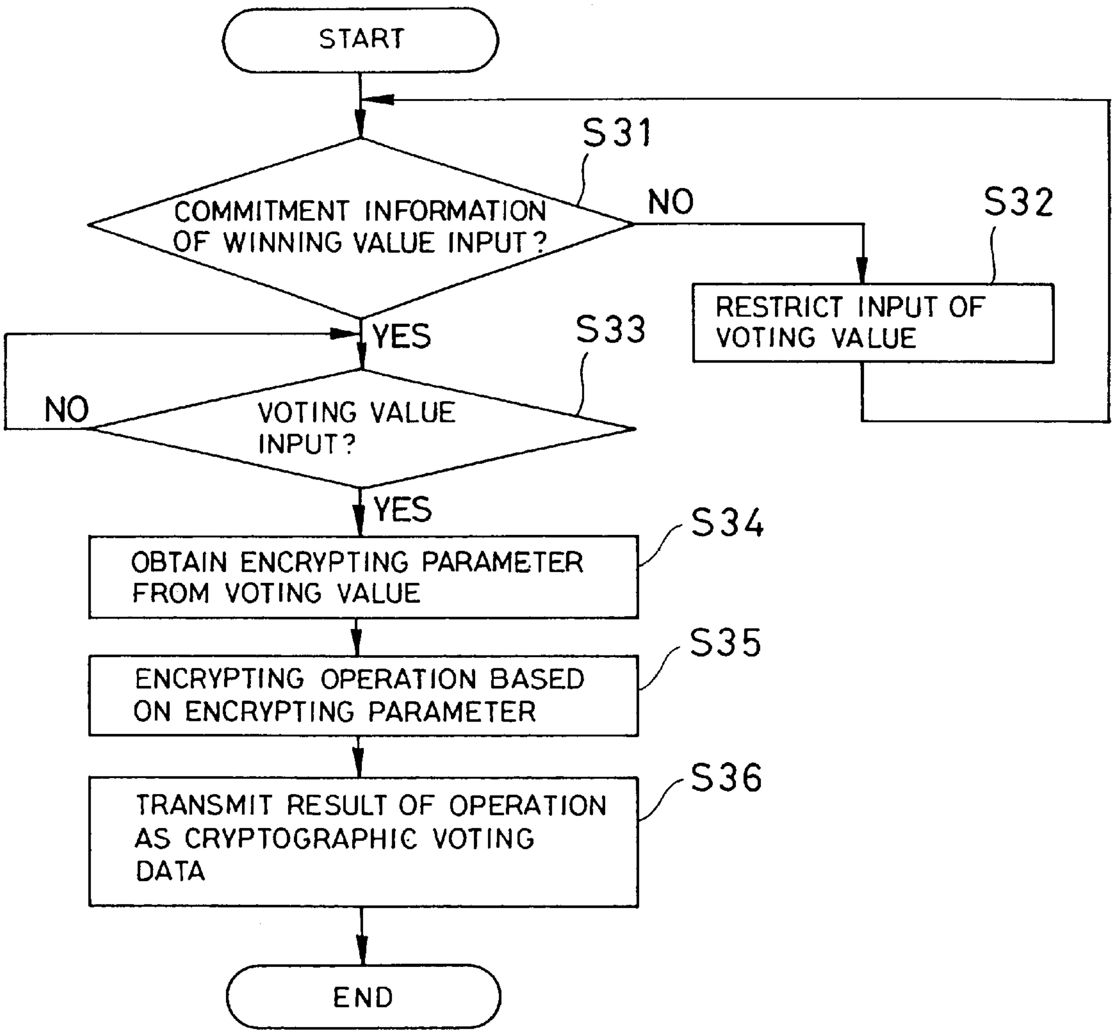
FIG. 8 is a flowchart showing a process operation of a voter sub-system of FIG. 7.
Figure 9:
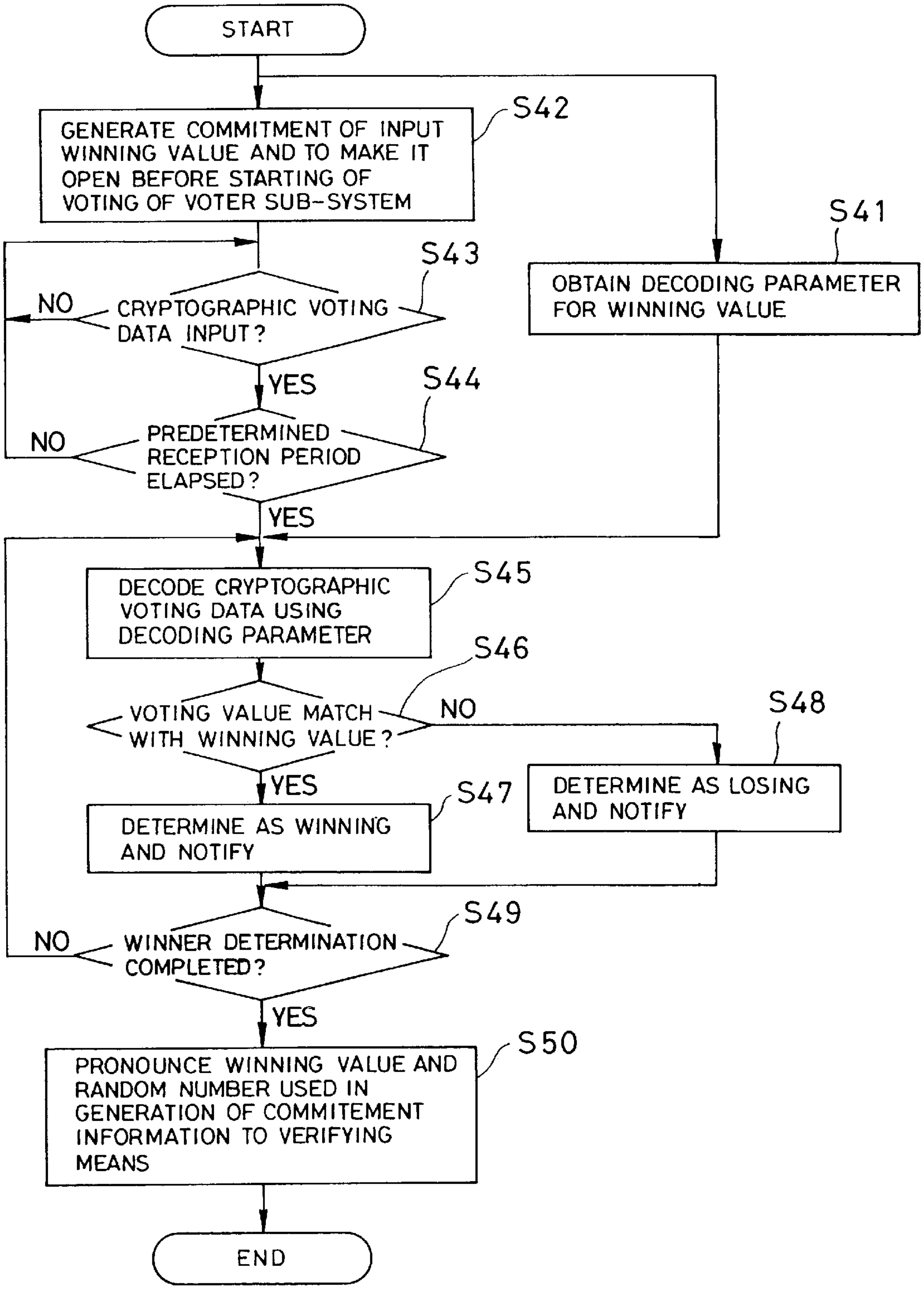
FIG. 9 is a flowchart showing a process operation of a management sub-system of FIG. 7.

FIG. 8 is a flowchart showing the process operation of the voter sub-system 5 of FIG. 7, and FIG. 9 is a flowchart showing process operation of the management sub-system of FIG. 7. Discussion will be given for operation of the third embodiment of the winning determining system according to the present invention with reference to FIGS. 7 to 9. The processes shown in FIGS. 8 and 9 may be realized by executing the programs stored in the not shown control memories of the voter sub-system 5 and the management sub-system 6. As the control memory, ROM, IC memory and the like may be used.

The parameter obtaining means 11 of the voter sub-system 5 inhibits inputting of the voting value until the seal receiving means 51 receives the commitment information from the seal means 61 (steps S31 and S32 of FIG. 8).

The parameter obtaining means 11 is responsive to the input voting value (step S33 of FIG. 8) to obtain the encrypting parameter necessary for encryption processing means 12 depending upon the voting value (step S34 of FIG. 8). The encryption processing means 12 performs encrypting operation on the basis of the supplied encrypting parameter to supply the result of encrypting operation to the transmitting means 13 (step S35 of FIG. 8). The transmitting means 13 supplies the result of encrypting operation to the management sub-system 2 as the cryptographic voting data (step S36 of FIG. 8).

The winning value input means 22 of the management sub-system 6 supplies the input winning value to the decoding parameter obtaining means 23 and the seal means 61. The decoding parameter obtaining means 23 is responsive to the input of the winning value to obtain the decoding parameter depending upon the winning value to supply to the retrieving means 24 (step S41 of FIG. 9).

The seal means 61 generates the commitment information of the winning value input from the winning value input means 22 to make it open before initiation of voting in the voter sub-system 5 (step S42 of FIG. 9.)

Upon reception of the cryptographic voting data transmitted from the voter sub-system 5 (step S43 of FIG. 9), the receiving means 21 supplies the cryptographic voting data to the retrieving means 24 after predetermined reception period (step S44 of FIG. 9). The retrieving means 24 decodes the cryptographic voting data using the decoding parameter (step S45 of FIG. 9) to perform retrieval of the voting value matching with the winning value (step S46 of FIG. 9).

If the voting value matching with the winning value is present, the retrieving means 24 determines all of the voter sub-systems transmitted the voting values matching with the winning value as winners (step S47 of FIG. 9). If the voting value matching with the winning value is not present, the retrieving means 24 determines that no winner is present (steps S48 and S49 of FIG. 9).

Subsequently, the pronouncement means 31 pronounces the winning value and random number r' used in generation of the commitment information (step S50 of FIG. 9). Then, the management sub-system 6 terminates the process. The verifier sub-system 4 verifies that the commitment information pronounced in advance is generated by the winning value and the random number make open after determination of winner by the verifying means 41.

Figure 10:
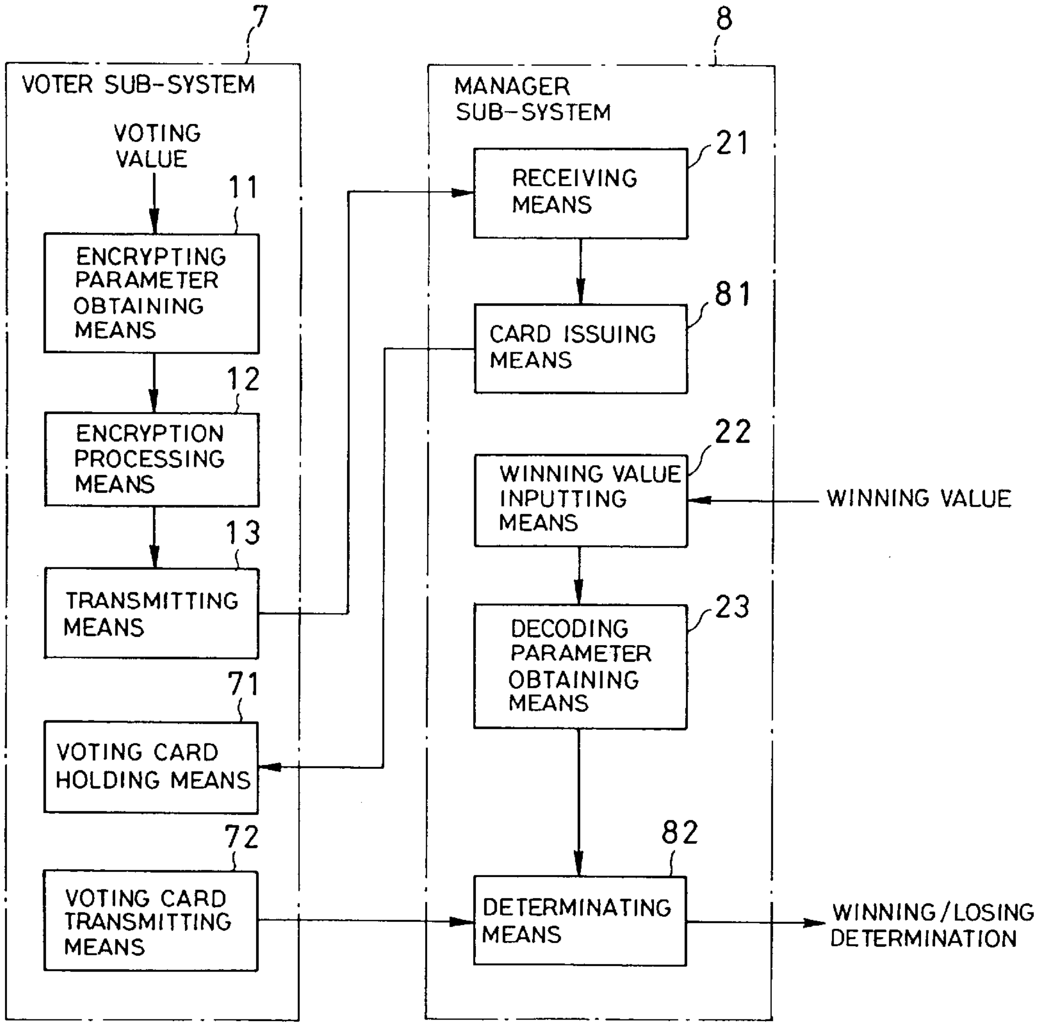
FIG. 10 is a block diagram showing a construction of the fourth embodiment of a winner determining system according to the present invention.

FIG. 10 is a block diagram showing the fourth embodiment of the winner determining system according to the present invention. In FIG. 10, the fourth embodiment of the winner determining system according to the present invention has the same construction as that of the first embodiment of the winner determining system according to the present invention shown in FIG. 1 except for voting card holding means 71 and voting card transmitting means 72 provided in a voter sub-system 7 and a voting card issuing means 81 and a determining means 82 provided in a management sub-system 8. The like components to those of the first embodiment shown in FIGS. 1 and 2 will be identified by like reference numerals and constructions and operations of those common components will be omitted from the following disclosure in order to avoid redundant disclosure for keeping the disclosure simple enough to facilitate clear understanding of the present invention.

The fourth embodiment of the winner determining system according to the present invention is a system applicable for a soccer betting card issuing system. Though the voter sub-system 7, one votes an expected winner team using the present invention to the management sub-system 8 with encryption. The management sub-system 8 issues a voting card (soccer betting) with providing a signature of the management sub-system 8 in the cryptographic voting data to send back to the voter sub-system 7 after reception of the cryptographic voting data.

After knowing the winner team in the soccer game, the voter sub-system 7 holding the voting card voting the winning team exhibits the voting card voted to the winning team to the management sub-system 8. Then, the management sub-system 8 determines whether the exhibited voting card contains voting for the winning team, namely winning value or not. If determination is made that the content of the voting card matches with the wining value, the winning share is paid for the holder of the winning card.

By employing the fourth embodiment of the winner determining system according to the invention, even when the voting card is seen, the content of voting of the voter can be kept secret, and, even to the management system 8, the content of voting other than winning value can be kept secret.

Namely, the voter sub-system 7 transmits the expected winning team name to the management sub-system 8 from the transmitting means 13 with encryption. The management sub-system 8 is responsive to reception of the cryptographic voting data by the receiving means 21 thereof to issue a voting card (soccer betting) with providing signature of the management sub-system 6 to the cryptographic voting data by the card issuing means 81 to return to the voter system 7.

After the winning team becomes known in the soccer game, the voter sub-system 7 holding the voting card voting the winning team name in the voting card holding means 71 transmits the voting card to the management sub-system 8 from the voting card transmitting means 72. The determining means 82 of the management sub-system 8 determines whether the content of voted by the voting card from the voter sub-system 8 is the winning team name or not.

Figure 11:
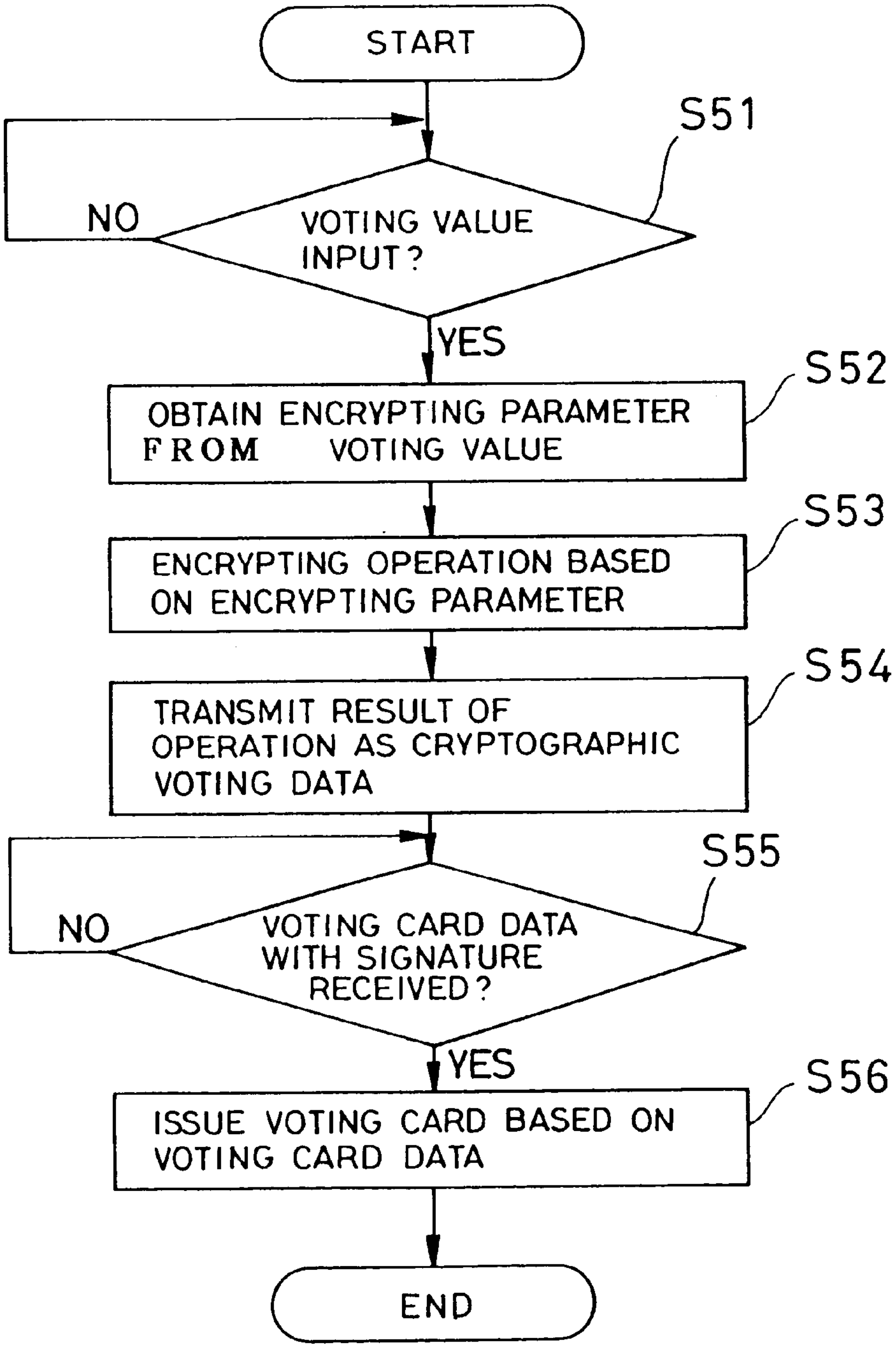
FIG. 11 is a flowchart showing a process operation of a voter sub-system of FIG. 10.
Figure 12:
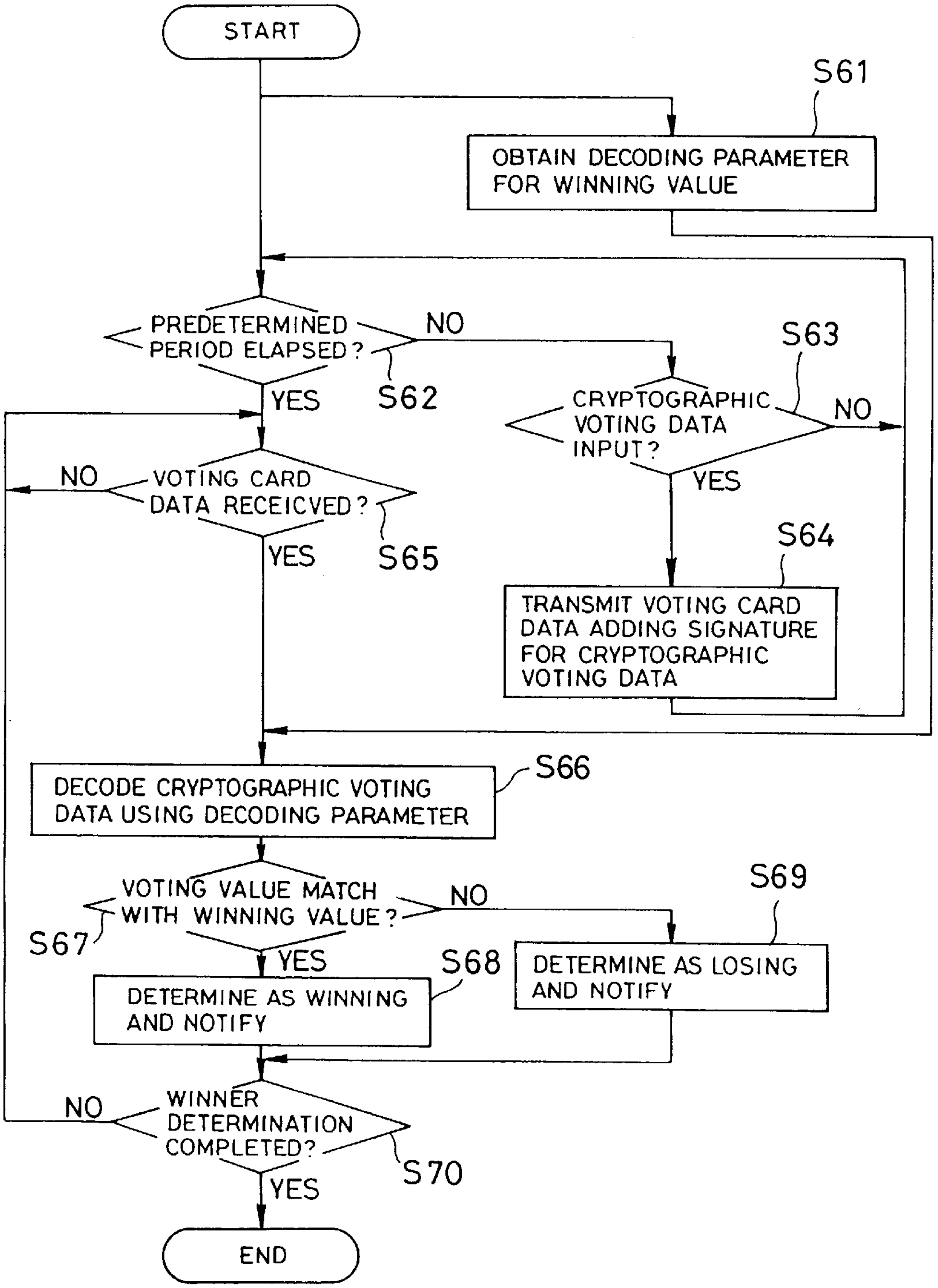
FIG. 12 is a flowchart showing a process operation of a management sub-system of FIG. 10.

FIG. 11 is a flowchart showing the process operation of the voter sub-system 7 and FIG. 12 is a flowchart showing the process operation of the management sub-system 8. Discussion will be given for the operation of the fourth embodiment of the winner determining system according to the present invention with reference to FIGS. 10 to 12. The processes shown in FIGS. 11 and 12 are realized by executing the programs stored in the not shown control memories in the voter sub-system 7 and the management sub-system 8. As the control memory, ROM, IC memory and the like may be used.

When the parameter obtaining means 11 of the voter sub-system 7 is input to the voting value (step S51 of FIG. 11), the encrypting parameter necessary for the encryption processing means 12 is obtained depending upon the voted value for supplying to the encryption processing means 12 (step S52 of FIG. 11). The encryption processing means 12 performs encrypting operation on the basis of the encrypting parameter supplied thereto. The result of encryption is supplied to the transmitting means (step S53 of FIG. 11). The transmitting means 13 supplies the result of encryption to the management sub-system 8 as the cryptographic voting data (step S54 of FIG. 11).

In the winning value inputting means 22 of the management sub-system 8, the winning value input to the management sub-system 8 is supplied to the decoding parameter obtaining means 23. The decoding parameter is then obtained depending upon the winning value and is supplied to the determining means 82 (step S61 of FIG. 12).

On the other hand, the receiving means 21 is responsive to reception of the cryptographic voting data transmitted from the voter sub-system 7 to supply the cryptographic voting data to the card issuing means 81 (step S63 of FIG. 12). The card issuing means 81 returns the voter sub-system 7 by providing the signature of the management sub-system 8 to the cryptographic voting data as the voting card data (step S64 of FIG. 12).

When the voting card data provided with the signature is transmitted from the management sub-system 8 (step S55 of FIG. 11), the voting card holding means 71 of the voter sub-system 7 holds the voting card data and issues the voting card on the basis of the voting card data (step 56 of FIG. 12).

After the wining team becomes to be known in the soccer game, the voting card transmitting means 72 transmits the voting card data provided with the signature of the management sub-system 8 to the management sub-system 8.

In the management sub-system 8, when the voting card data is received from the voter sub-system 7 (step S65 of FIG. 12) after the predetermined reception period (step S62 of FIG. 12), the determining means 82 decodes the voting card data using the decoding parameter (step S66 of FIG. 12) to determined whether the voting value matching with the winning value is present (step S67 of FIG. 12).

If the voting value matching with the winning value is present, the determining means 82 determines all of the voter sub-systems 7 transmitted the voting value matching with the winning value as winners (step S68 of FIG. 12). On the other hand, if no voting value matches with the winning value, the determining means determines that no winner is present (steps S69 and S70 of FIG. 12). Then, process is terminated.

Figure 13:
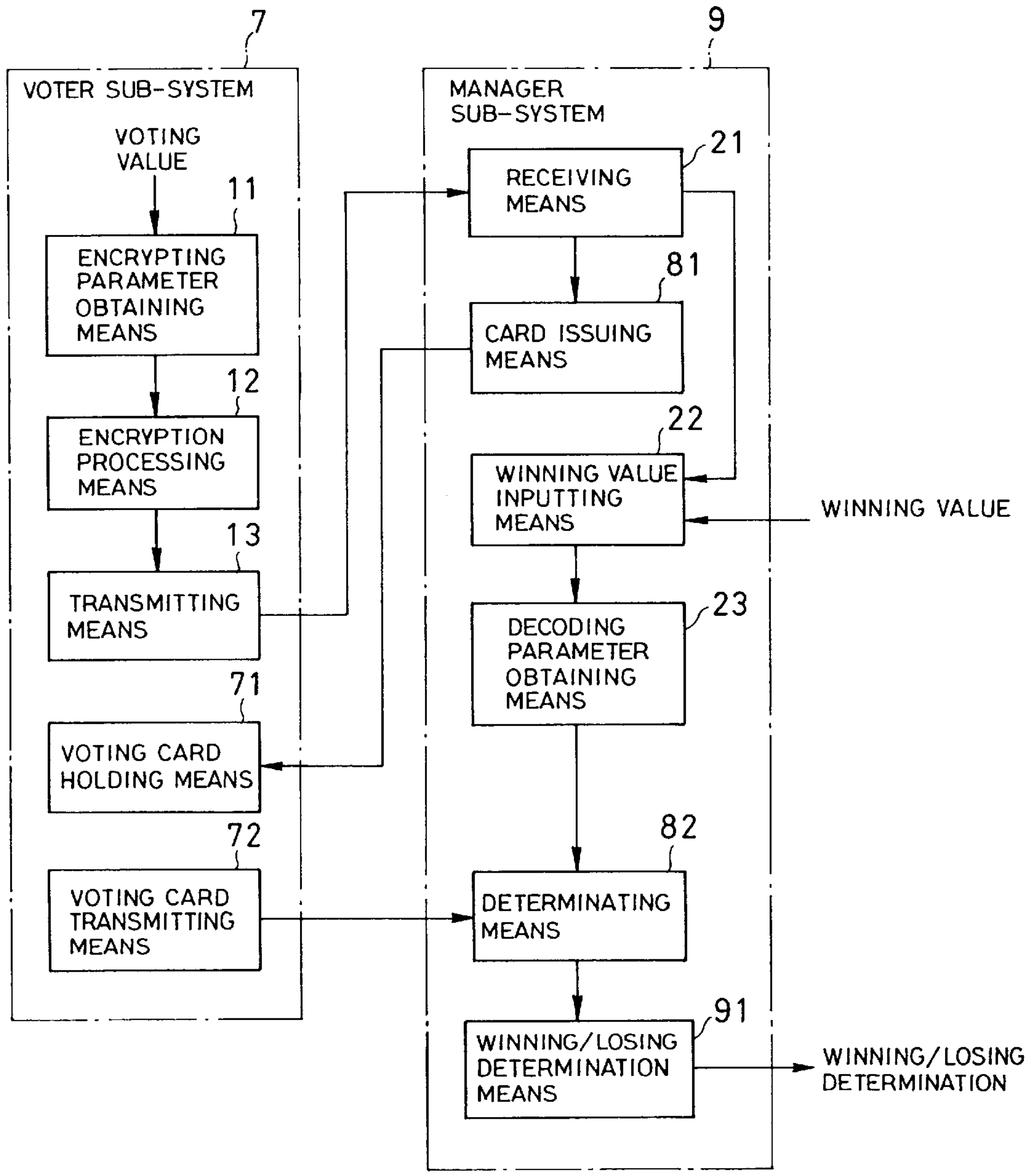
FIG. 13 is a block diagram showing a construction of the fifth embodiment of a winner determining system according to the present invention.

FIG. 13 is a block diagram showing a construction of the fifth embodiment of the winner determining system according to the present invention. The fifth embodiment of the winner determining system of the invention is similar to the fourth embodiment of the winner determining system of FIG. 10 except for winning/losing determining means 91 provided in a management sub-system 9 and the winning value input means 22 holding the cryptographic voting data. The like components to those shown in the fourth embodiment will be identified by like reference numerals and constructions and operations of those common components will be omitted from the following, disclosure in order to avoid redundant disclosure for keeping the disclosure simple enough to facilitate clear understanding of the present invention.

The fifth embodiment of the winner determining system according to the present invention is a system adapted to the case where the winning share to be paid back to the winners depends on number of winners, in which the cryptographic voting data from the voter sub-systems 7 are held in the winning value input means 22 of the management sub-system 8 and thus can know number of winners.

In this case, in the fifth embodiment of the winner determining system according to the present invention, similarly to the fourth embodiment of the invention, the voter sub-systems 7 encrypts the expected winning teams to vote to the management sub-system 9. After receiving the cryptographic voting data, the management sub-system 9 issues the voting card (soccer betting) provided with a signature of the management sub-system 9 on the cryptographic voting data, and send it back to the voter sub-system 7. The cryptographic voting data from the voter sub-system 7 is then stored in the winning value input means 22.

After the winning team becomes known in the soccer game, the voter sub-system 7 holding the voting card voting the winning team name therein transmits the voting card to the management sub-system 9. The management sub-system 9 determines whether the content of voted by the voting card from the voter sub-system 8 is the winning team name or not.

If the voting value matching with the winning value is present, then, the winning share is paid to the holder of the corresponding voting card. At this time, since the content of voting matching with the winning value are held in the winning value inputting means 22, number of the winning values, namely number of the winners are counted to calculate the winning share to be paid to the voters.

By employing the fifth embodiment of the winner determining system according to the invention, even when the voting card is seen, the content of voting of the voter can be kept secret, and, even to the management system 9, the content of voting other than winning value can be kept secret.

Namely, the voter sub-system 7 transmits the expected winning team name to the management sub-system 9 from the transmitting means 13 with encryption. The management sub-system 9 is responsive to reception of the cryptographic voting data by the receiving means 21 thereof to issue a voting card (soccer betting) with providing signature of the management sub-system 6 to the cryptographic voting data by the card issuing means 81 to return to the voter system 7. In conjunction therewith, the cryptographic voting data from the voter sub-system 7 is held in the winning value input means 22.

After the winning team becomes known in the soccer game, the voter sub-system 7 holding the voting card voting the winning team name in the voting card holding means 71 transmits the voting card to the management sub-system 8 from the voting card transmitting means 72.

The determining means 82 of the management sub-system 9 determines whether the content of voted by the voting card from the voter sub-system 7 is the winning team name or not to supply the result of determination and the contents held in the winning value inputting means 22 to the winning/losing determining means 91. The winning/losing determining means 91 calculates the winning share to be paid to the winner from the content held in the winning value inputting means 22 to output notice of winning and the amount of the winning share to the winner, and notice losing to the loser, as results of winning and losing determination.

Figure 14:
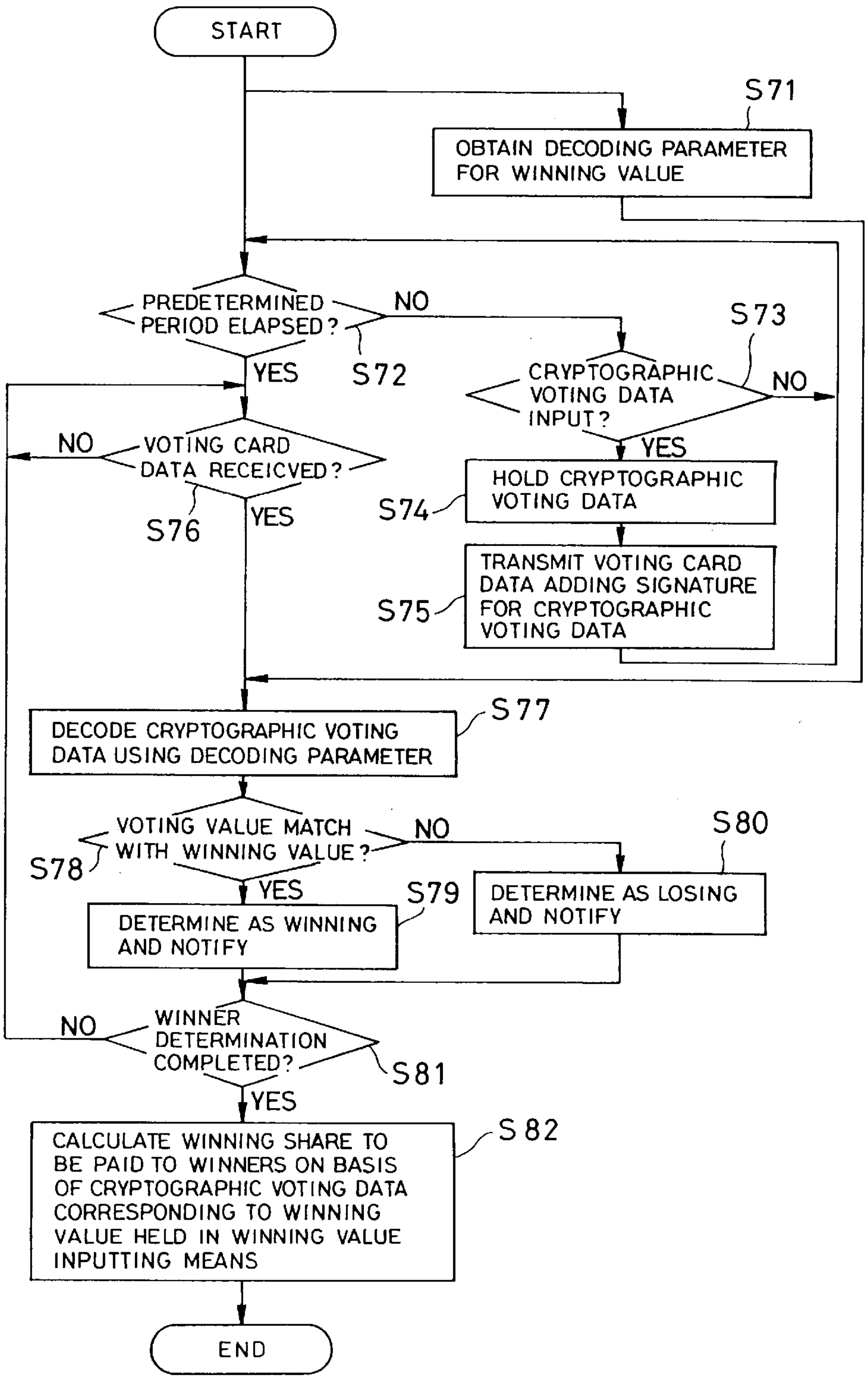
FIG. 14 is a flowchart showing a process operation of a management sub-system of FIG. 13.

FIG. 14 is a flowchart showing the process operation of the management sub-system 9. Discussion will be given for the operation of the fifth embodiment of the winner determining system according to the present invention with reference to FIGS. 13 and 14. It should be noted that the process operation of the voter sub-system 7 is the same as that of the fourth embodiment, and thus the discussion therefor will be omitted to avoid redundant disclosure and whereby to keep the disclosure simple enough to facilitate clear understanding of the present invention. The process shown in FIG. 14 is realized by executing the program stored in the not shown control memory in the management sub-system 9. As the control memory, ROM, IC memory and the like may be used.

In the winning value inputting means 22 of the management sub-system 9, the winning value input to the management sub-system 9 is supplied to the decoding parameter obtaining means 23. The decoding parameter obtaining means 23 is responsive to inputting of the wining value, to obtain the decoding parameter depending upon the winning value and is supplied to the determining means 82 (step S71 of FIG. 11).

On the other hand, the receiving means 21 is responsive to reception of the cryptographic voting data transmitted from the voter sub-system 7 to supply the cryptographic voting data to the winning value inputting means and the card issuing means 81 (step S73 of FIG. 14). The winning value inputting means 22 holds the cryptographic voting data (step S74 of FIG. 14). The card issuing means 81 returns the voter sub-system 7 by providing the signature of the management sub-system 9 to the cryptographic voting data as the voting card data (step S75 of FIG. 14).

In the management sub-system 9, when the voting card data is received from the voter sub-system 7 (step S76 of FIG. 14) after the predetermined reception period (step S72 of FIG. 14), the determining means 82 decodes the voting card data using the decoding parameter (step S77 of FIG. 14) to determined whether the voting value matching with the winning value is present (step S78 of FIG. 14).

If the voting value matching with the winning value is present, the determining means 82 determines all of the voter sub-systems 7 transmitted the voting value matching with the winning value as winners (step S79 of FIG. 14). On the other hand, if no voting value matches with the winning value, the determining means 82 determines that no winner is present (steps S80 and S81 of FIG. 14). Then, process is terminated. Thereafter, the winning/losing determining means 91 calculates the wining share to be paid to the winners on the basis of the content held in the winning value inputting means 22 (step S82 of FIG. 14). The winning/losing determining means 91 then outputs notice of winning and the amount of the winning share to the winner, and notice losing to the loser, as results of winning and losing determination.

As set forth above, on the basis of the basic construction, in which the voter sub-system 1, 5 and 7 encrypt the voting value depending upon the encrypting parameter, and the management sub-system 2, 3, 6, 8 and 9 perform decoding with the decoding parameter depending upon the winning value, the voters voting the value matching with the winning value can be elected as winner, and the voting data of the voters other than the winner can be kept secret. Also, the system permits the third party to verify the determination of winning or losing.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A winner determining system comprising:

voter sub-systems for voting a voting value indicative of a selected event among a finite number of events;

a management sub-system for identifying at least one voter sub-system voted a winning value determined among said finite number of events as a winner;

said voter sub-system including encrypting parameter obtaining means for obtaining an encrypting parameter depending upon said voting value, encryption processing means for generating a cryptographic voting data by performing encrypting process on the basis of said encrypting parameter obtained by said encrypting parameter obtaining means, and transmitting means for transmitting said cryptographic voting data generated by said cryptography processing means; and said management sub-system including receiving means for receiving said cryptographic voting data until a predetermined reception time limit, decoding parameter obtaining means for obtaining decoding parameter for said winning value and retrieving means for retrieving the voting value matching with said winning value with decoding said cryptographic voting data received by said receiving means with said decoding parameter obtained by said decoding parameter obtaining means.

2. A winner determining system as set forth in claim 1, wherein said encryption processing means encrypts a known value using the encrypting parameter corresponding to said voting value obtained by said encrypting parameter obtaining means;

said retrieving means includes decoding processing means for sequentially performing decoding process for said cryptographic voting data received by said receiving means with said decoding parameter obtained by said decoding parameter obtaining means, and determining means for determining that the voting value matches with said winning value when the result of process of said decoding processing means becomes said known value.

3. A winner determining system as set forth in claim 2, wherein said encryption processing means includes a process for encrypting said known value with a public key corresponding to said voting value, said decoding processing means includes a process for decoding said cryptographic voting data with a secure key corresponding to said public key corresponding to said winning value.

4. A winner determining system as set forth in claim 1, wherein said management sub-system further includes pronouncement means for pronouncing a part of said decoding parameter corresponding to the voting value and a result of decoding.

5. A winner determining system as set forth in claim 1, wherein said management sub-system further includes second pronouncement means for pronouncing a guarantee information guarantying validity of the winning value in advance.

6. A winner determining method comprising:

providing voter sub-systems for voting a voting value indicative of a selected event among a finite number of events;

providing a management sub-system for identifying at least one voter sub-system voted a winning value determined among said finite number of events as a winner;

said voter sub-system including the steps of obtaining an encrypting parameter depending upon said voting value, generating a cryptographic voting data by performing encrypting process on the basis of said encrypting parameter obtained by said encrypting parameter obtaining means, and transmitting said cryptographic voting data generated by said cryptography processing means; and said management sub-system including the steps of receiving said cryptographic voting data until a predetermined reception time limit, obtaining decoding parameter for said winning value and retrieving the voting value matching with said winning value with decoding said cryptographic voting data received by said receiving means with said decoding parameter obtained by said decoding parameter obtaining means.

7. A winner determining method as set forth in claim 6, wherein said cryptograph voting data generating step comprises a step of encrypting a known value using the encrypting parameter corresponding to said voting value obtained by said encrypting parameter obtaining means;

said retrieving step comprises the steps of sequentially performing decoding process for said cryptographic voting data received by said receiving means with said decoding parameter obtained by said decoding parameter obtaining means, and determining that the voting value matches with said winning value when the result of process of said decoding processing means becomes said known value.

8. A winner determining method as set forth in claim 6, wherein said step of generating cryptograph voting data comprises a step of encrypting said known value with a public key corresponding to said voting value, said step of sequentially decoding cryptographic voting data comprises the step of decoding said cryptographic voting data with a secure key corresponding to said public key corresponding to said winning value.

9. A winner determining method as set forth in claim 6, wherein said management sub-system further comprises a step of pronouncing a part of said decoding parameter corresponding to the voting value and a result of decoding.

10. A winner determining method as set forth in claim 6, wherein said management sub-system further comprises a step of pronouncing a guarantee information guarantying validity of the winning value in advance.

11. In a winner determining system comprising voter sub-systems for voting a voting value indicative of a selected event among a finite number of events and a management sub-system for identifying at least one voter sub-system voted a winning value determined among said finite number of events as a winner, a recording medium storing a winner determination control program to be executed in said winner determining system comprising:

a process operating said voter sub-system for obtaining an encrypting parameter depending upon said voting value, generating a cryptographic voting data by performing encrypting process on the basis of said encrypting parameter obtained by said encrypting parameter obtaining means, and transmitting said cryptographic voting data generated by said cryptography processing means; and a process operating said management sub-system for receiving said cryptographic voting data until a predetermined reception time limit, obtaining decoding parameter for said winning value and retrieving the voting value matching with said winning value with decoding said cryptographic voting data received by said receiving means with said decoding parameter obtained by said decoding parameter obtaining means.

* * * * *